(12) United States Patent
Yu

(10) Patent No.: US 10,906,473 B1
(45) Date of Patent: Feb. 2, 2021

(54) ROTATABLE VEHICLE MOUNTED BICYCLE RACK

(71) Applicant: XIAMEN EASEPAL ENTERPRISES LTD, Xiamen (CN)

(72) Inventor: Bofeng Yu, Xiamen (CN)

(73) Assignee: XIAMEN EASEPAL ENTERPRISES LTD, Xiamen (CN)

( * ) Notice: Subject to any disclaimer, the term of this patent is extended or adjusted under 35 U.S.C. 154(b) by 0 days.

(21) Appl. No.: 17/019,364

(22) Filed: Sep. 14, 2020

(30) Foreign Application Priority Data

Apr. 27, 2020 (CN) .................. 2020 2 0665226 U

(51) Int. Cl.
*B60R 9/10* (2006.01)
*B62H 3/04* (2006.01)

(52) U.S. Cl.
CPC .............. *B60R 9/10* (2013.01); *B62H 3/04* (2013.01)

(58) Field of Classification Search
CPC .... B60R 9/06; B60R 9/10; B62H 3/00; B62H 3/04; B62H 3/06; B62H 3/10; Y10S 224/924
USPC ................................. 211/5, 17–24
See application file for complete search history.

(56) References Cited

U.S. PATENT DOCUMENTS

| | | | | |
|---|---|---|---|---|
| 5,303,857 A * | 4/1994 | Hewson | ............. | B60R 9/06 224/282 |
| 5,373,978 A * | 12/1994 | Buttchen | ............. | B60R 9/06 224/510 |
| 5,427,286 A * | 6/1995 | Hagerty | ............. | B60R 9/00 211/18 |
| 5,529,231 A * | 6/1996 | Burgess | ............. | B60R 9/10 224/502 |
| 5,685,469 A * | 11/1997 | Stapleton | ............. | B60R 9/10 224/505 |
| 5,950,892 A * | 9/1999 | Tsai | ............. | B60R 9/06 224/497 |
| 6,129,371 A * | 10/2000 | Powell | ............. | B60R 9/06 224/502 |
| 6,286,738 B1 * | 9/2001 | Robins | ............. | B60R 9/06 224/314 |
| 6,443,345 B1 * | 9/2002 | Bloemer | ............. | B60R 9/06 224/502 |
| 6,547,116 B2 * | 4/2003 | Anderson | ............. | B60R 9/06 224/506 |
| 6,644,525 B1 * | 11/2003 | Allen | ............. | B60R 9/06 224/282 |

(Continued)

*Primary Examiner* — Patrick D Hawn
(74) *Attorney, Agent, or Firm* — Bayramoglu Law Offices LLC

(57) ABSTRACT

A rotatable vehicle mounted bicycle rack includes an L-shaped fixed rod with one end fixed to the rear of a car. The upper part of the other end of the L-shaped fixed rod is provided with a rotating base, and the rotating base includes two rotating plates that are vertically arranged. One end of a support beam is rotatably connected between the middle parts of the rotating plates, and the other end is connected to a main body support. The main body support includes two inverted T-shaped support plates. A cross rod passes through two horizontal ends of the main body support and is fixed to it. A vertical rod is rotatably connected to an upper part of the main body support. Each of the two ends of the cross rod is connected to two wheel seats. The upper part of the vertical rod is provided with two fixed hooks.

2 Claims, 2 Drawing Sheets

(56) References Cited

U.S. PATENT DOCUMENTS

| | | | | |
|---|---|---|---|---|
| 6,929,163 B1* | 8/2005 | Pedrini | | B60R 9/06 224/506 |
| 7,240,816 B2* | 7/2007 | Tsai | | B60R 9/06 211/195 |
| 7,261,229 B1* | 8/2007 | Allen | | B60R 9/06 224/495 |
| 7,815,083 B2* | 10/2010 | Clausen | | B60R 9/06 224/501 |
| 8,235,267 B2* | 8/2012 | Sautter | | B60R 9/06 224/497 |
| D672,704 S * | 12/2012 | Grago | | D12/408 |
| 8,640,888 B2* | 2/2014 | Liu | | B60R 9/10 211/17 |
| 9,393,912 B2* | 7/2016 | Pedrini | | B60R 9/10 |
| 9,802,549 B1* | 10/2017 | Shen | | B60R 9/06 |
| 10,093,243 B2* | 10/2018 | Shen | | B60R 9/10 |
| 10,183,627 B1* | 1/2019 | Liu | | B60R 9/10 |
| 10,384,618 B2* | 8/2019 | Williams | | B60R 9/06 |
| 2003/0102343 A1* | 6/2003 | Anderson | | B60R 9/10 224/536 |
| 2005/0061842 A1* | 3/2005 | Tsai | | B60R 9/06 224/501 |
| 2005/0133555 A1* | 6/2005 | Bove | | B60R 9/06 224/324 |
| 2008/0099522 A1* | 5/2008 | Clausen | | B60R 9/10 224/519 |
| 2008/0230579 A1* | 9/2008 | Wang | | B60R 9/10 224/400 |
| 2009/0120984 A1* | 5/2009 | Sautter | | B60R 9/10 224/497 |
| 2009/0236382 A1* | 9/2009 | Sautter | | B60R 9/10 224/497 |
| 2010/0096424 A1* | 4/2010 | Kuschmeader | | B60R 9/10 224/509 |
| 2010/0230455 A1* | 9/2010 | Wang | | B60R 9/10 224/533 |
| 2010/0320247 A1* | 12/2010 | Wang | | B60R 9/10 224/567 |
| 2011/0068140 A1* | 3/2011 | Stevens | | B60R 9/10 224/533 |
| 2013/0022440 A1* | 1/2013 | Sautter | | B60R 9/06 414/800 |
| 2013/0062383 A1* | 3/2013 | Jeli | | B60R 9/10 224/497 |
| 2013/0062385 A1* | 3/2013 | Pedrini | | B60R 9/06 224/501 |
| 2013/0214020 A1* | 8/2013 | Pedrini | | B60R 9/06 224/501 |
| 2013/0243518 A1* | 9/2013 | Wiedemann | | B60R 9/10 403/66 |
| 2014/0027484 A1* | 1/2014 | Loken | | B60R 9/10 224/497 |
| 2014/0151421 A1* | 6/2014 | Loken | | B60R 9/10 224/519 |
| 2014/0158729 A1* | 6/2014 | Pedrini | | B60R 9/10 224/501 |
| 2014/0246467 A1* | 9/2014 | Hein | | B60R 9/10 224/519 |
| 2016/0068111 A1* | 3/2016 | Walker | | B60R 9/06 224/521 |
| 2017/0253188 A1* | 9/2017 | Shen | | B60R 9/10 |
| 2017/0349110 A1* | 12/2017 | Bass | | B60R 9/10 |
| 2017/0349111 A1* | 12/2017 | Ramsdell | | B60R 9/06 |
| 2018/0072237 A1* | 3/2018 | Kuschmeader | | B60R 9/10 |
| 2018/0134229 A1* | 5/2018 | Shen | | B60R 9/06 |
| 2018/0147997 A1* | 5/2018 | Woelfling | | B60R 9/10 |
| 2018/0354427 A1* | 12/2018 | Yazdian | | A45F 3/24 |
| 2019/0016271 A1* | 1/2019 | Garceau | | B60R 9/06 |
| 2019/0161022 A1* | 5/2019 | McFadden | | B60R 9/10 |
| 2020/0023787 A1* | 1/2020 | Prescott | | B60R 9/06 |
| 2020/0031289 A1* | 1/2020 | Williams | | B60R 9/045 |
| 2020/0086803 A1* | 3/2020 | Settelmayer | | B60R 9/06 |
| 2020/0156724 A1* | 5/2020 | Kuschmeader | | B60R 9/10 |
| 2020/0172185 A1* | 6/2020 | Hammond | | B62H 3/12 |

* cited by examiner

ROTATABLE VEHICLE MOUNTED BICYCLE RACK

CROSS REFERENCE TO THE RELATED APPLICATIONS

This application is based upon and claims priority to Chinese Patent Application No. 202020665226.4, filed on Apr. 27, 2020, the entire contents of which are incorporated herein by reference.

TECHNICAL FIELD

The present invention relates to the technical field of vehicle mounted bicycle racks, and more particularly, to a rotatable vehicle mounted bicycle rack.

BACKGROUND

Vehicle mounted bicycle racks are commonly used to carry bicycles on a car. Currently, the main types of vehicle mounted bicycle racks on the market include roof mounted bicycle racks and rear mounted bicycle racks. To use the roof mounted bicycle racks, typically the entire rack must be fixed on the top of the vehicle, which adds height to the vehicle. Often, a complete removal from the top of the vehicle is required when not in use. This causes considerable inconvenience during disassembly and assembly. Similarly, majority of rear mounted bicycle racks are mounted on vehicles at a fixed position, and can only be placed horizontally. Having a rack fixed horizontally at the rear of a small vehicle adds the overall length of the car, which also causes much inconvenience. An improved vehicle mounted bicycle rack is highly desirable.

SUMMARY

The technical problem to be solved by the present invention is to overcome the shortcomings in the prior art by providing a rotatable vehicle mounted bicycle rack that is structurally reasonable, simple to operate, and convenient to install. The bicycle rack can be adjusted to a horizontal state or vertical state according to the actual situation, which is suitable for various vehicle types.

In order to solve the above-mentioned technical problems, the present invention provides the following technical solution. A rotatable vehicle mounted bicycle rack includes an L-shaped fixed rod with one end fixed to the rear of a car. The upper part of the other end of the L-shaped fixed rod is provided with a rotating base, and the rotating base includes two rotating plates that are vertically arranged. One end of a support beam is rotatably connected between the middle parts of the rotating plates, and the other end of the support beam is connected to a main body support. The main body support includes two inverted T-shaped support plates. A cross rod passes through the two horizontal ends of the main body support and is fixed to the main body support. A vertical rod is rotatably connected to the upper part of the main body support. Each of the two ends of the cross rod is connected to the two wheel seats. The upper part of the vertical rod is provided with two fixed hooks.

Further, the wheel seats are respectively arranged on both sides of the cross rod, and a group of wheel seats arranged on the same side of the cross rod include two wheel seats. The wheel seat is provided with a first sleeve seat that is sleeved on the cross rod, and the first sleeve seat is provided with a bolt for fastening.

Further, the fixed hooks are respectively arranged on both sides of the vertical rod, and the orientation of the fixed hooks corresponds to the orientation of the group of wheel seats. The fixed hook is provided with a second sleeve seat sleeved on the vertical rod, and the second sleeve seat is provided with a bolt for fastening.

Further, the bottom end of the vertical rod is provided with a fixed spring buckle. A hinge point between the vertical rod and the main body support is arranged above the fixed spring buckle. The main body support is provided with three spring buckle holes distributed in an inverted triangle configuration, and the fixed spring buckle is respectively engaged with the spring buckle holes after being rotated.

Further, the upper part and one side of the rotating plate are each provided with a clamping slot. Each of the sides of the support beam facing the rotating plates is provided with an elongated clamping slot. A stretching rod is inserted into the support beam, and each of the two sides of the stretching rod is provided with a clamping pin matching with the elongated clamping slot. One end of the stretching rod is connected to the bottom of the support beam through a spring, and the other end of the stretching rod is hinged to the middle of a handle. The end of the handle opposite to a grip of the handle is hinged to the main body support.

Compared with the prior art, the present invention has many advantages, including a cross beam rotating mechanism that is simple to operate and convenient to install. The present invention provides a bicycle rack design that eliminates frequent removal and storage, and the inconvenience associated with occupying large space. Based on a user's particular need, the bicycle rack can be adjusted to a horizontal state or vertical state, which is suitable for various vehicle types and can be used in a wide range of automobiles use.

Figure 1:
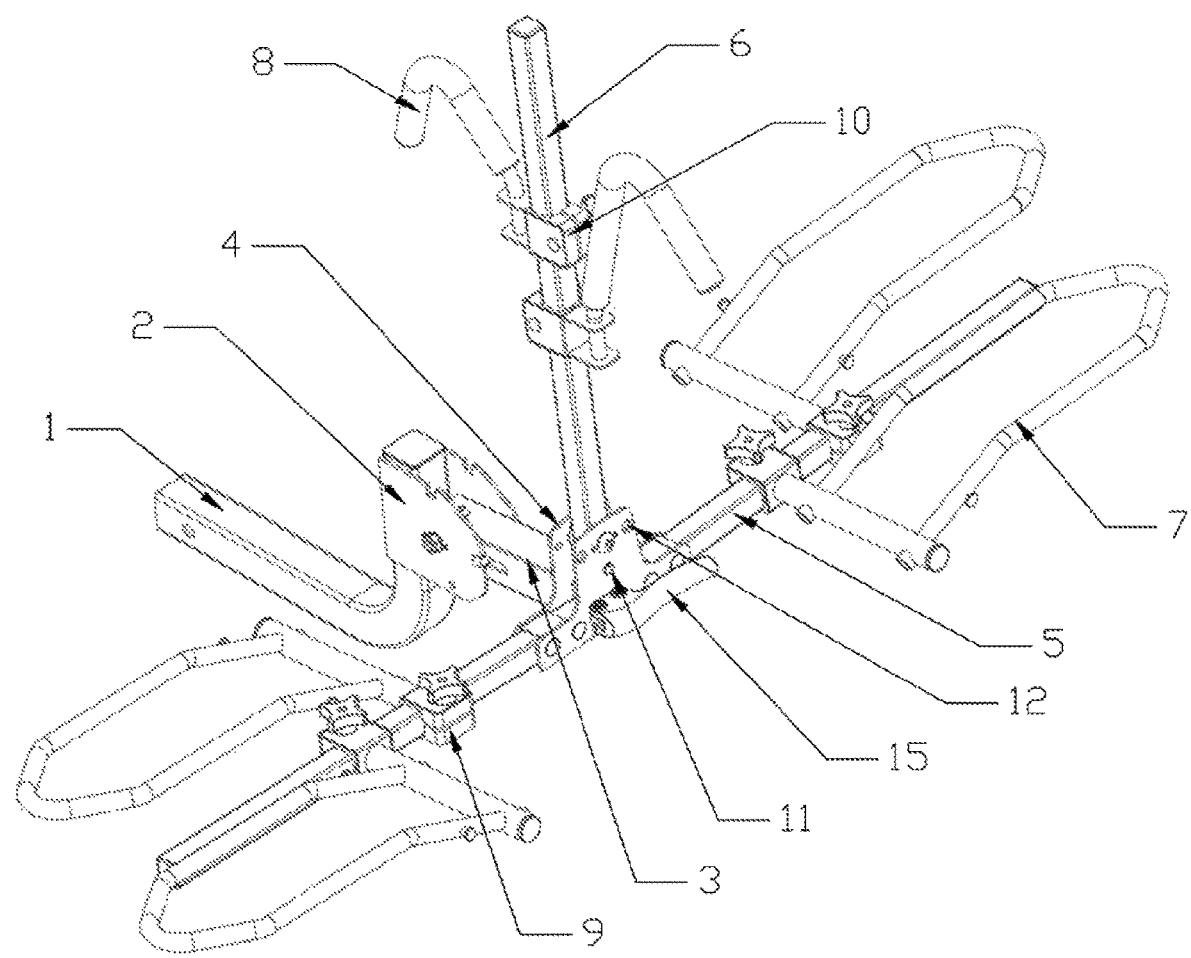
FIG. 1 is a structural schematic diagram of the present invention in a horizontal state.
Figure 2:
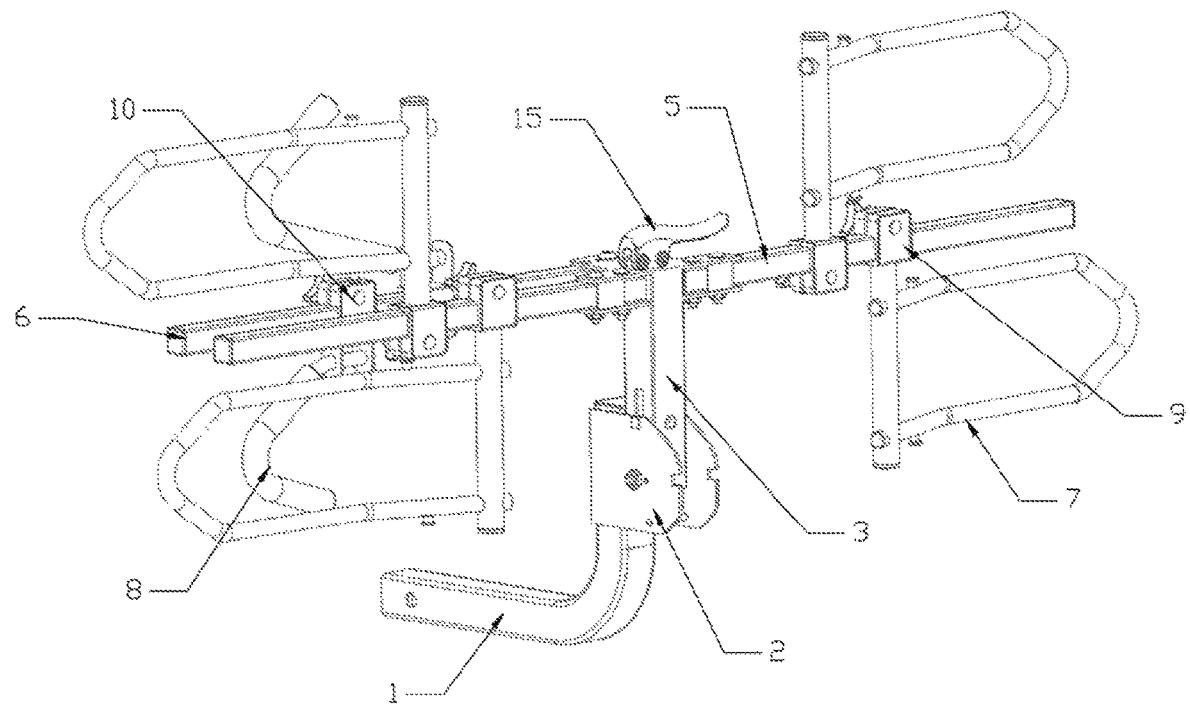
FIG. 2 is a structural schematic diagram of the present invention in a vertical state.
Figure 3:
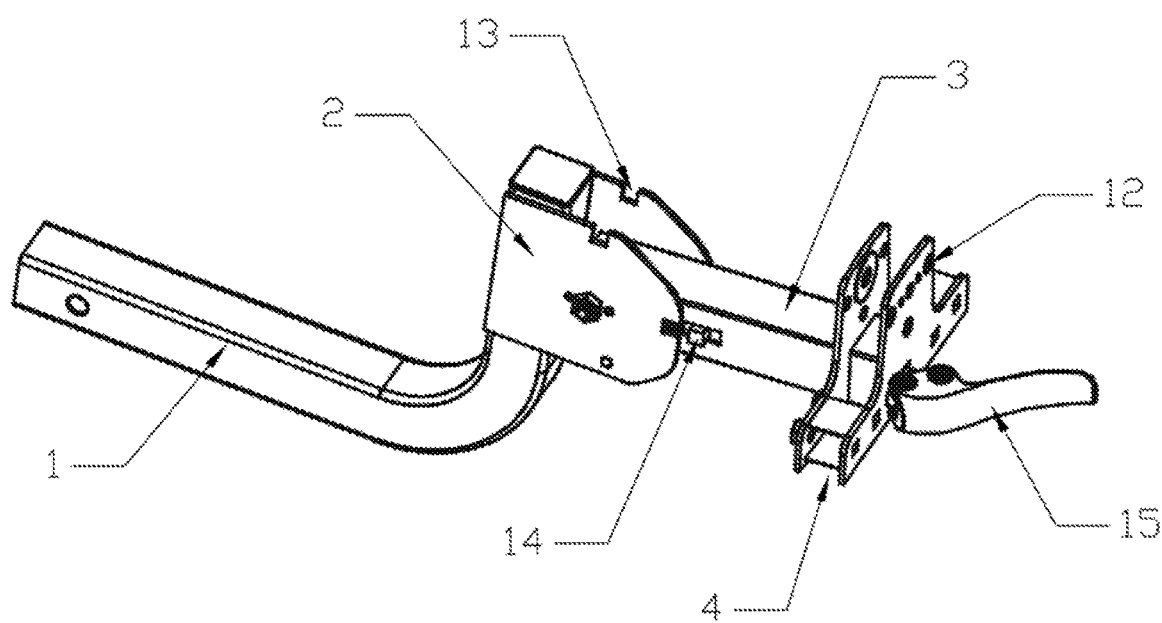
FIG. 3 is a partial structural schematic diagram showing the connection of the support beam of the present invention.

In the figures: 1, L-shaped fixed rod; 2, rotating plate; 3, support beam; 4, main body support; 5, cross rod; 6, vertical rod; 7, wheel seat; 8, fixed hook; 9, first sleeve seat; 10, second sleeve seat; 11, fixed spring buckle; 12, spring buckle hole; 13, clamping slot; 14, clamping pin; 15, handle.

DETAILED DESCRIPTION OF THE EMBODIMENTS

In the description of the present invention, it should be understood that the orientation or position relationship indicated by the terms "center", "horizontal", "upper", "lower", "left", "right", "vertical", "horizontal", "top", "bottom", "inside" and "outside" are based on the orientation or position relationship shown in the drawings, which is only intended to facilitate the description of the invention and to simplify the description, rather than to indicate or imply that the referred device or element must have a specific orientation or be constructed and operated in a specific orientation, and cannot be construed as a limitation to the present invention. In addition, the terms "first" and "second" are used only for the purpose of description and cannot be construed as indicating or implying relative importance or implicitly indicating the number of technical features indicated. Thus, the features defined by "first" and "second" may explicitly or implicitly include one or more of the features. In the description of the present invention, unless otherwise specified, "a plurality of" means two or more. In addition, the term "include/comprise" and any variation thereof is intended to cover exclusive inclusion.

The present invention is further described in detail with reference to the drawings.

In a specific embodiment of the present invention, the rotatable vehicle mounted bicycle rack includes a L-shaped fixed rod 1 with one end fixed to the rear of the car. The upper part of the other end of the L-shaped fixed rod is provided with a rotating base, and the rotating base includes two vertically arranged rotating plates 2. One end of the support beam 3 is rotatably connected between the middle parts of the rotating plates 2, and the other end of the support beam 3 is connected to the main body support 4. The main body support 4 includes two inverted T-shaped support plates. The cross rod 5 passes through two horizontal ends of the main body support 4 and is fixed to the main body support 4. The vertical rod 6 is rotatably connected to the upper part of the main body support 4. Each of the two ends of the cross rod 5 is connected to two wheel seats 7. The upper part of the vertical rod 6 is provided with two fixed hooks 8. The wheel seats 7 are respectively arranged on both sides of the cross rod 5. A group of wheel seats 7 arranged on the same side of the cross rod 5 include two wheel seats. The wheel seat 7 is provided with the first sleeve seat 9 and is sleeved on the cross rod 5. The first sleeve seat 9 is provided with a bolt for fastening. The fixed hooks 8 are respectively arranged on both sides of the vertical rod 6. The orientation of the fixed hooks 8 corresponds to the orientation of the group of wheel seats 7. The fixed hook 8 is provided with the second sleeve seat 10 and is sleeved on the vertical rod 6. The second sleeve seat 10 is provided with a bolt for fastening. The bottom end of the vertical rod 6 is provided with the fixed spring buckle 11. The hinge point between the vertical rod 6 and the main body support 4 is arranged above the fixed spring buckle 11. The main body support 4 is provided with three spring buckle holes 12 distributed in an inverted triangle configuration. The fixed spring buckle 11 is respectively engaged with the spring buckle holes 12 after being rotated. The upper part and one side of the rotating plates 2 are each provided with the clamping slot 13. Each of the sides of the support beam 3 facing the rotating plates 2 is provided with an elongated clamping slot. A stretching rod is inserted into the support beam 3, and each of the two sides of the stretching rod is provided with the clamping pin 14 matching with the elongated clamping slot. One end of the stretching rod is connected to the bottom of the support beam 3 through a spring, and the other end of the stretching rod is hinged to the middle of the handle 15. The end of the handle 15 opposite to a grip of the handle 15 is hinged to the main body support 4.

The working principle of the present invention is as follows. The bicycle rack of the present invention includes the rotating base, the main body support 4, a spring pin mechanism in the support beam 3 and a pulling buckle mechanism. One end of the support beam 3 is connected to a circular hole in the middle of the rotating plate 2 by a screw. Two clamping slots are provided on the edge of the rotating plate 2. The clamping pin of the spring pin mechanism in the support beam 3 is automatically engaged into the clamping slot of the rotating plate 2 under an action of spring tension, so as to fix the support beam 3. When rotating the support beam 3, the handle 15 at the other end of the support beam 3 is pulled so that the clamping pin is accordingly pulled out from the clamping slot and disengaged from the rotating plate 2. When the support beam 3 rotates to another clamping slot, the clamping pin is automatically engaged into the clamping slot to fix the support beam 3 under the action of spring tension to realize a transformation between a horizontal state and a folding state.

Two groups of wheel seats 7 configured to place the bicycle wheels are arranged on the cross rod 5 to move along the cross rod. The fixed hook on the vertical rod 6 configured to fix the bicycle on the wheel seat moves up and down along the vertical rod. In addition, the fixed spring buckle 11 is fixed on the vertical rod and is engaged with the fixed spring buckle hole 12. The fixed spring buckle is pressed so that the vertical rod rotates around the connection point and is fixed automatically.

To sum up, pressing the fixed spring buckle that is located on the vertical rod to rotate the vertical rod to a position parallel to the cross rod fix the vertical rod. The handle can be pulled to rotate the support beam 3, and engage the support beam 3 into the clamping slot on the rotating base. Thus, placing the bicycle rack is in a vertical folded state.

The present invention and the embodiments thereof have been described above. This description is not restrictive, the drawings only illustrate one of the embodiments of the present invention, and the actual structure is not limited to this. Generally, if those having ordinary skill in the art are inspired by the present invention and design structural implementations and embodiments similar to the technical solution without departing from the creative concept of the present invention, these structural implementations and embodiments shall fall within the scope of protection of the present invention.

What is claimed:

1. A rotatable vehicle mounted bicycle rack, comprising an L-shaped fixed rod with a first end fixed to a rear of a car, wherein an upper part of a second end of the L-shaped fixed rod is provided with a rotating base; the rotating base comprises two rotating plates, wherein the two rotating plates are vertically arranged; a first end of a support beam is rotatably connected between middle parts of the two rotating plates, and a second end of the support beam is connected to a main body support; wherein the two rotating plates are fixed to the L-shaped fixed rod; the main body support comprises two inverted T-shaped support plates; a cross rod passes through two horizontal ends of the main body support and the cross rod is fixed to the main body support; a vertical rod is rotatably connected to an upper part of the main body support; two ends of the cross rod are connected to two wheel seats, and an upper part of the vertical rod comprises two fixed hooks;

wherein the two wheel seats are respectively arranged on both sides of the cross rod; a group of wheel seats are arranged on one side of the cross rod; a wheel seat of the group of wheel seats is provided with a first sleeve seat sleeved on the cross rod, and the first sleeve seat is provided with a bolt for fastening;

wherein the fixed hooks are respectively arranged on both sides of the vertical rod; an orientation of the fixed hooks corresponds to an orientation of the group of wheel seats; a fixed hook of the two fixed hooks is provided with a second sleeve seat sleeved on the vertical rod, and the second sleeve seat is provided with a bolt for fastening;

wherein a bottom end of the vertical rod is provided with a fixed spring buckle; a hinge point between the vertical rod and the main body support is arranged above the fixed spring buckle; the main body support is provided with three spring buckle holes distributed in an inverted triangle configuration; and the fixed spring buckle engages at one of the three distributed spring buckle holes after each rotation.

2. The rotatable vehicle mounted bicycle rack according to claim 1, wherein an upper part and one side of a rotating plate of the two rotating plates are each provided with a clamping slot; each of sides of the support beam facing the two rotating plates is provided with an elongated clamping slot; a stretching rod is inserted into the support beam, and each of two sides of the stretching rod is provided with a clamping pin matching with the elongated clamping slot; a first end of the stretching rod is connected to a bottom of the support beam through a spring, and a second end of the stretching rod is hinged to a middle of a handle, and an end of the handle is opposite to a grip of the handle and the end of the handle is hinged to the main body support.

\* \* \* \* \*